June 19, 1956 D. D. GRIEG ET AL 2,751,558

RADIO FREQUENCY FILTER

Filed Oct. 21, 1952 2 Sheets-Sheet 1

INVENTORS
DONALD D. GRIEG
HERBERT F. ENGELMANN
BY
Percy P. Lantzy
ATTORNEY

June 19, 1956 D. D. GRIEG ET AL 2,751,558

RADIO FREQUENCY FILTER

Filed Oct. 21, 1952 2 Sheets-Sheet 2

INVENTORS
DONALD D. GRIEG
HERBERT F. ENGELMANN
BY Percy P. Lantzy
ATTORNEY 2,751,558
Patented June 19, 1956

2,751,558

RADIO FREQUENCY FILTER

Donald D. Grieg, North Caldwell, and Herbert F. Engelmann, Mountain Lakes, N. J., assignors to International Telephone and Telegraph Corporation, a corporation of Maryland Application October 21, 1952, Serial No. 316,047

12 Claims. (Cl. 333—73)

This invention relates to radio frequency filters and more particularly to filter systems for microwave energy and is a continuation in part of our copending application, Serial No. 238,258, filed July 21, 1951, now abandoned.

Microwave filter systems heretofore required expensive component elements including waveguides and lengths of coaxial lines. The precision requirements of these elements are exacting and, herefore, render difficult the economic manufacture of satisfactory filter apparatus for microwave frequency bands.

One of the objects of this invention is to provide a simplified form of microwave filtering system which does not require the precision and exactness of high frequency filter systems heretofore believed necessary; and a further object is to provide by various means both inductances and capacitances for use in such filter and other microwave systems.

Another object of this invention is to provide a microwave filter system that may employ as part of the filter system a wall of the chassis or other apparatus associated therewith.

Still another object of the invention is to provide a microwave filter system which is of a character readily adapted for the use of printed circuit techniques.

One of the features of the invention is the utilization of a basic principle applicable in a theoretically perfect parallel conductor transmission system. If a parallel transmission line could be made so that the electric and magnetic fields thereof were maintained substantially the same therealong regardless of irregularity of shape and size and relative spacing of the conductors, such as may be obtained by having identical conductors with a given constant spacing therebetween, a minimum of radiation loss would be experienced. Such theoretically perfect parallel conductor systems are, however, for all practical purposes unobtainable. In our copending applications Serial No. 227,896, filed May 23, 1951, and Serial No. 234,503, filed June 30, 1951, transmission systems are disclosed which utilize this theoretically perfect parallel line principle without requiring the exact identity and spacing of two parallel conductors. The present invention also accomplishes this result for filter systems by providing two closely spaced conductors with one of the conductors, hereinafter referred to as the "ground" conductor, wider than the other conductor, hereinafter referred to as the "line" conductor, so as to produce in effect an image of the line conductor on the opposite side of the ground conductor. This relationship provides for an electric and magnetic field distribution between the two conductors which is substantially the same as the distribution between one conductor and the neutral plane of a two-conductor parallel system. The so-called ground conductor theoretically might have a width extending to infinity but for practical purposes need only be a little wider than the line conductor as long as its greater width provides for ample concentration of the electric field between the adjacent surfaces of the two conductors. The width of the ground conductor should be of the order of two or three times the width of the line conductor although it might preferably be wider if circumstances provide such an extended conductor surface. The width or diameter of the line conductor and the spacing between the line and ground conductors determine the characteristic impedance of the line-above-ground transmission path. The spacing between conductors is preferably a fraction of a quarter wavelength and the width of the line conductor should be less than a half wavelength, the actual width chosen being largely dependent upon the characteristic impedance desired. In the filter, the line conductor is disposed in various arrangements and configurations to present, in conjunction with the ground conductor, inductance and capacitance so as to provide resonant filter sections.

The above-mentioned and other features and objects of this invention will be best understood by reference to certain embodiments of the invention taken in conjunction with the accompanying drawings, wherein.

Figure 1:
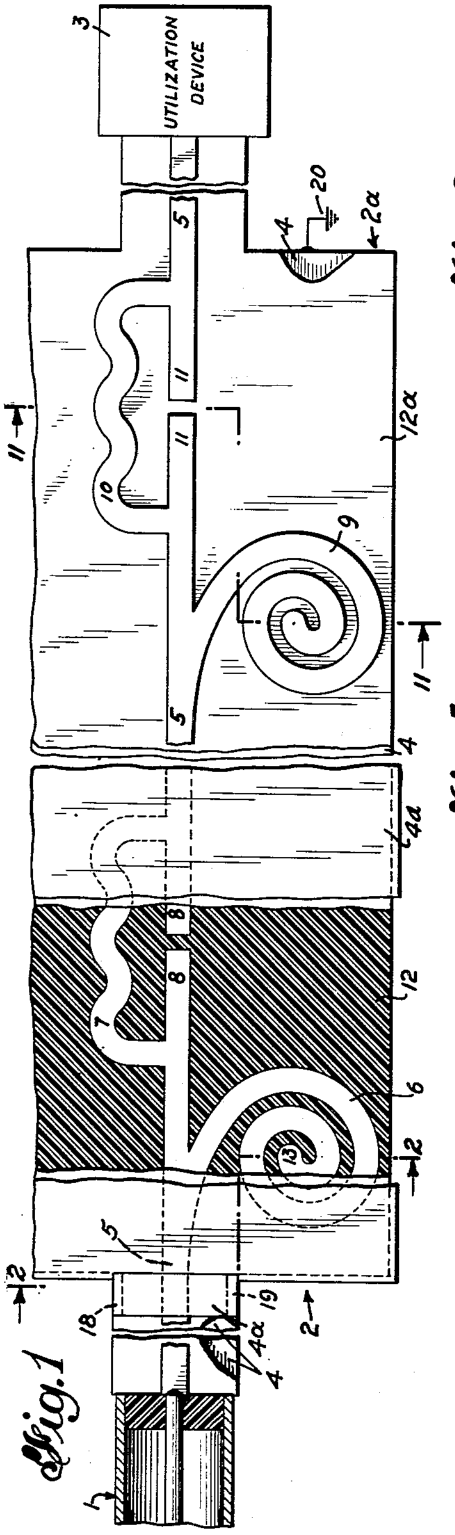
Fig. 1 is a plan view of a filter incorporating the principles of the invention.
Figure 2:
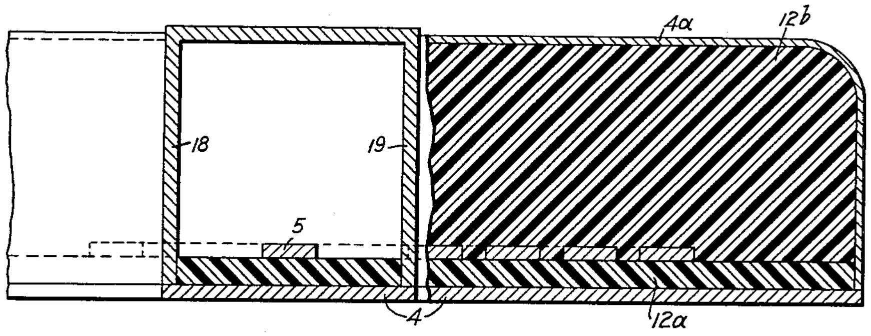
Fig. 2 is a cross-sectional view taken along line 2—2 of Fig. 1.

Referring to Figs. 1 and 2, a coaxial feed line 1 is shown feeding a filter 2, 2*a* which in turn energized a utilization device 3. The filter 2, 2*a* is shown broken indicating two parts thereof, the part 2 being shown as comprising a cover or shield with the line conductor portions embedded in dielectric material, such as shown in cross-section in Fig. 2, which part 2*a* is shown with the overlying portion removed to expose the line conductor. The filter, basically, comprises a conductive baseplate or ground conductor 4 and a line conductor 5 arranged in certain configurations as indicated at 6, 7, 8, 9, 10, and 11. The part 6 comprises a spiral conductor which is connected to the line conductor 5 preferably at an acute angle thereto. The spiral 6 is embedded in dielectric material 12 as indicated in Fig. 2. This spiral may be provided with an open end 13 or the end 13 may be connected through the layer of dielectric material to the ground conductor 4. The spiral 6 may be made of different lengths depending on the reactance desired. If a preponderance of inductive reactance is desired, the length should be electrically shorted and less than one-quarter wavelength while if a preponderance of capacitive reactance is required, a length greater than one-quarter wavelength shorted at its end should be provided.

The energy fed into the filter from the transmission line 1 is first applied to the inductance spiral 6, which also possesses distributed capacitance with respect to the ground conductor. The spiral 6 thus provides an inductance in parallel with the distributed capacitance between the line and ground conductors 5 and 4. This first filtering section thus comprises a parallel resonant circuit such as indicated at 14, Fig. 3, the distributed inductance and parallel capacitance being indicated as 6*a* and 6*b*, respectively.

The configuration of the part 7 is such as to provide inductance in series with the line condutcor 5. The conductor part 7 is made sinusoidal to provide the desired inductance. The parts 8 provide capacitance in accordance with the end areas and the space relation thereof. The conductors 7 and 8 comprise a parallel resonant circuit in series with the line conductor 5 in the manner indicated at 15, *7a*, and *8a* corresponding to the elements 7 and 8 in Fig. 1. Continuing along the filter, the next element 9 likewise provides a parallel resonant circuit similar to the spiral 6, the corresponding equivalent being shown at 16 in Fig. 3. The next filtering section comprising conductors 10 and 11 provides a parallel resonant circuit in series with the line conductor similarly as in the case of conductors 7 and 8, the equivalent being indicated at 17 in Fig. 3.

The launching of microwave energy from the coaxial line 1 to the filter may include a line-above-ground transmission length as indicated in our above-mentioned copending application. Such a line-above-ground transmission system is shown connecting both ends of the filter. Where the conductor 4 is a wall of a chassis, the ground conductor may be an extension thereof. It should be understood, however, that the coaxial line 1 may be connected directly to the input and output sides of the filter if desired. In Fig. 1, where the filter is made with a conductive cover 4a with the line conductor configurations embedded in dielectric material 12, the coaxial line may be connected directly thereto with the inner conductor in the plane of conductor strip 5 and the outer conductor connected to conductors 4 and 4a. Such an extension is indicated in Figs. 1 and 2 for the line-above-ground conductor system 5, 4 by providing sidewalls 18 and 19 of conductive material at the coupling connection between the transmission line and the filter. The sidewalls 18 and 19 reduce perturbation of the waves and insure proper launching from the transmission line to the filter section. Where the coaxial line is directly connected to the filter, the outer conductor is connected to conductors 4 and 4a with side portions extending therebetween substantially as indicated for the sidewalls 18 and 19.

In the right hand side of Fig. 1 the line conductor configuration is exposed by omitting the upper layer of dielectric 12b and cover 4a. The line conductors 5, 9, 10, and 11 are supported on a thin layer of dielectric material 12a.

The filter shown in Figs. 1 and 2 is easily constructed by employing circuit printed techniques. The base conductor 4 is selected wider than the overall configuration of the line conductor including its capacitive and inductive portions. The base conductor 4 is provided with a thin layer of dielectric material 12a onto which the configurations of the line conductor, in forms providing capacitances and inductances as desired is applied in known printed technique. For example, the dielectric layer may be of polystyrene, polyethylene, "Teflon" or other flexible dielectric material and the conductors may be made of conductive paint or ink, or conductive material may be chemically deposited, plated and etched, sprayed through a stencil or dusted onto selected prepared surfaces. Also conductive strips or configurations may be made or applied by a die-stamping operation.

To increase the Q of the filter it may be preferable to shield the filter sections substantially as illustrated in Figs. 1 and 2, thereby minimizing radiation loss. As shown, the cover 4a may comprise a sheet or a coating of conductive material applied by spraying or otherwise onto the outer surface of the dielectric layer 12b. In order that the cover 4a does not affect electrically the line-above-ground field distribution, the spacing $L_2$ of the cover with respect to the line conductor 5 should be several times the spacing $L_1$ between the line and ground conductors. For example, this spacing $L_2$ may be as much as ten times or more than the spacing $L_1$. In connection with the spacings $L_1$ and $L_2$ it is believed desirable to call attention to the fact that if these two distances were made equal, thereby presenting a symmetrical sandwich, then the line-above-ground field distribution would be entirely changed, and instead, a coaxial type of field distribution would be obtained. Should such distances be varied slightly from a symmetrical relationship, uneven field distribution would exist on opposite sides of the line conductors thereby producing a net component which would result in undesirable radiation laterally from the edges of the sandwich. By maintaining the spacing $L_2$ several times $L_1$ a truly concentrated line-above-ground field distribution is insured with a minimum of stray radiation, which incidently is trapped by the cover 4a. If desired, the undersurface of the conductor covering 4a may be coated with a layer of lossy material as hereinafter described in connection with the illustrations of Figs. 4 and 11.

While the filter 2, 2a is shown in Fig. 1 as a band-pass type, it will be clear that other filters, high pass and low pass, can be constructed according to the principles of this invention.

Figures 3, 4, 5, 6, 7, 8, 9, 10:
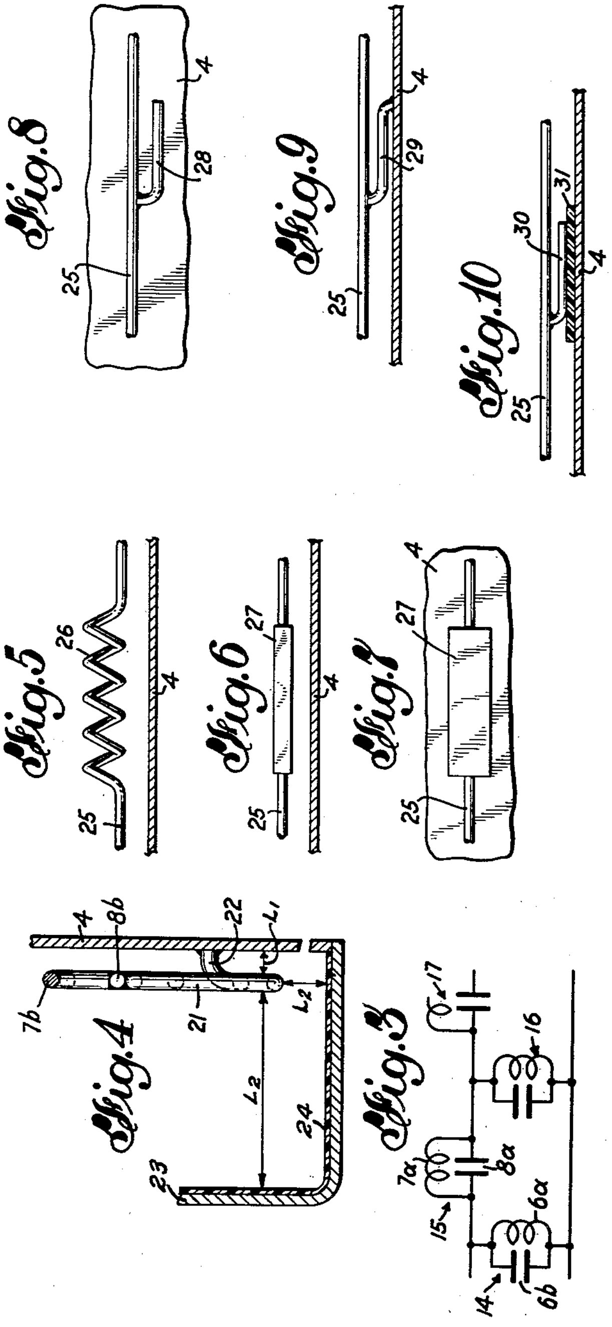
Fig. 3 is a schematic diagram of the electric wave filter equivalent to that of the filter of Fig. 1.
Fig. 4 is a sectional view of a modified form of inductance that may be used.
Fig. 5 is a side view of another modified form of inductance.
Figs. 6 and 7 are side and plan views, respectively, of one form of capacity which may be used.
Fig. 8 is a plan view of another form of capacitance.
Figs. 9 and 10 are side views of other forms of inductance usable in the described filters.

In Fig. 4 a modified form of inductance is provided where air replaces the layer of dielectric material. The line conductor may be in the form of a wire 21, either round, rectangular or other shape in cross-section, spiralled similarly as indicated at 6 in Fig. 1 with the inner end 22 connected to the ground conductor 4. The spiral is maintained in a plane substantially parallel to the plate 4 and the connection 22 acts both as a short and as a support therefor. This connection can be made where the length of the spiral is substantially a quarter wavelength long or greater or less than a quarter wavelength as may be desired. Where desired, the filter section may be enclosed by a conductive cover 23 preferably spaced a distance $L_2$ several times the distance $L_1$ between conductors 21 and 4, the inside surface thereof being coated with a lossy conductive material 24 such as aquadag to minimize cavity resonance. Such cover plate acts as a shield and also minimizes radiation losses. If desired, a similar shield may be provided for the entire filter or any component thereof.

Referring to Fig. 5 an alternative method of constructing an inductance is shown. A conductor 25 which is deformed into a helix 26 and hence possesses inductance is placed approximate the ground conductor 4. The proximity of helix 26 to ground conductor 4 determines the distributed capacity thereof with respect to the ground conductor. If it is desired to make the element shown a pure inductance, the helix 26 should be remote from the ground conductor. However, if it is desired to make the circuit of Fig. 5 constitute a parallel resonant circuit, then the helix 26 should be placed close enough to ground conductor 4 to provide the desired amount of distributed capacitance.

Referring to Figs. 6 and 7, a line conductor 25 is shown deformed into a plate 27. If the size of the plate 27 is small compared to the wavelength of the energy propagated through the element, the plate provides a lumped capacity of magnitude proportional to the area of the plate. If, however, the plate 27 has dimensions of the order of the wavelength of the energy propagated therethrough, the element 27 will have series inductance as well as capacity and it will be clear that the plate can comprise either a pure capacity of a parallel resonant circuit depending upon the dimensions thereof with respect to the wavelength of energy propagated therethrough.

In Fig. 8 an alternative method of constructing a capacitance is shown. The line conductor 25 is shown with an attached conductor 28 which possesses capacity with respect to ground conductor 4. The conductor 28 is disposed parallel to both the line conductor 25 and the ground conductor 4. The value of this capacity may be adjusted by varying the length of the attached conductor 28. If the attached conductor 28 has a length large compared to the wavelength of the energy propagated along conductor 25, it may also possess series inductance in which case the element 28 will represent a series resonant circuit with respect to the ground conductor 4.

In Fig. 9, the line conductor 25 is shown with an attached conductor 29 which is also attached to the ground conductor 4. This structure constitutes an inductance since the conductor 29 has length which may be appreciable with respect to a wavelength of energy propagated along conductor 25. If in addition, conductor 29 has appreciable capacitance with respect to ground conductor 4 it may comprise a parallel inductance and capacitance, and thereby constitute a parallel resonant circuit.

In Fig. 10, a capacitive element is shown similar to that shown in Fig. 8 but including means to adjust the value of the capacity. The line conductor 25 is shown with an attached conductor 30 which, according to the principles of Fig. 8, constitutes a capacity between the line conductor 25 and ground conductor 4. The value of this capacity may be altered by placing a dielectric 31 between the conductor 30 and the ground conductor 4. The dielectric constant of this dielectric will determine the value of the capacity formed by element 30 and hence the value of this capacity may be altered by changing the nature of the dielectric 31.

Figure 11:
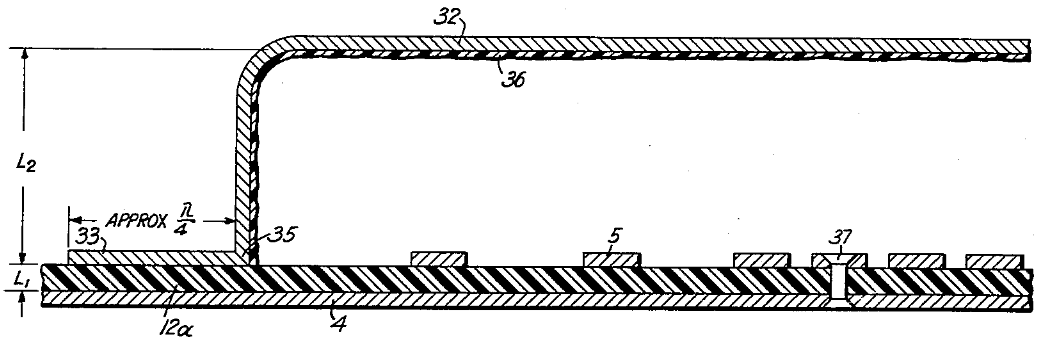
Fig. 11 is a cross-sectional view of another embodiment corresponding in general to the embodiment shown in Fig. 1, the cross-sectional view being similar to that viewed along line 11—11 of Fig. 1.

While the filter construction illustrated in Figs. 1 and 2 has been shown to include an upper layer of dielectric material **12*b* between the line conductors and the cover conductor 4*a*, we wish to point out that this layer 12*b* may be omitted. In Fig. 11 the layer 12*b* has been omitted thereby providing an air space above the line conductors 5. The cover 32 in this illustration is shown to be in the form of a removable cover which may be applied over the layer of dielectric 12*a* substantially as indicated. The cover is preferably of conductive material sufficiently strong to retain its shape and is provided with a lateral rim 33 of approximately one-quarter wavelength width to present a high impedance choke. For example, the impedance at the periphery 34 of the rim 33 is high and the electrical characteristic at the inner edge 35 of the rim is an equivalent short with respect to ground conductor 4. The relationship of the spacings $L_1$ and $L_2$ are preferably the same as stated in connection with Figs. 2 and 4, that is, the distance $L_2$ should be several times the distance $L_1$ to preserve the line-above-ground field distribution. The inside surface of the cover 32 is preferably coated with lossy conductive material 36 similarly as provided for the cover shown in Fig. 4. It will also be readily apparent to those skilled in the art that the cover 32** herein shown may be applied to other components and circuitry of the line-above-ground type other than the filters and reactive elements herein illustrated.

It will be understood that the reactance elements of Figs. 4 through 10 may be used in a filter construction according to the principles set forth in connection with the illustrations of Figs. 1, 2 and 11. Also these elements as well as those shown in Fig. 1 may be employed in other circuitry where inductive or capacitive reactance is desired. Thus, while we have described above the principles of our invention in connection with specific apparatus, it is to be clearly understood that this description is made by way of example only and not as a limitation to the scope of our invention, as set forth in the objects thereof and in the accompanying claims.

We claim:

1. A filter comprising a first conductor disposed to present a given configuration, a second conductor disposed in substantially parallel, spaced relation to said first conductor, the spacing between said first and second conductors being a fraction of a wavelength of the mid-frequency of the operating band, the width of said second conductor being greater than the greatest width of the configuration of said first conductor so that substantially the entire electric field distribution is concentrated therebetween in a manner substantially the same as the field distribution between one conductor and the neutral plane of a two-conductor parallel system, the configuration of said first conductor presenting, in conjunction with said second conductor, inductance and capacitance to form a resonant filter section, and a third conductor disposed in overlying relation wtih respect to at least certain of the configurations of said first conductor, said third conductor being spaced from said first conductor by an amount sufficiently greater than the spacing between said first and second conductors as to have negligible effect upon said field concentration between said first and second conductors, said third conductor comprising a cover having top and side walls overlying in spaced relation the configuration of said first conductor with said side walls electrically coupled to said second conductor, said side walls including a rim approximately a quarter wavelength wide and means to support said rim in spaced relation to said second conductor to form therewith an electric choke.

2. A filter according to claim 1, wherein said first and third conductors are spaced apart by an amount several times greater than the distance between said first and second conductors.

3. A filter according to claim 1 wherein said third conductor has a layer of lossy conductive material on the side of said third conductor facing said first conductor.

4. A filter according to claim 1, wherein both the first conductor and the second conductor comprise substantially flat ribbon-like conductors.

5. A filter according to claim 4, wherein the spacing between the first conductor and the second conductor contains a layer of solid dielectric material and the first conductor comprises conductive material carried by said layer.

6. A microwave filter comprising a first conductor, a second conductor having a substantially plane surface, a layer of dielectric material disposed on said plane surface, said first conductor being carried by said layer in substantially parallel spaced relation to said first conductor, the spacing between said first and second conductors being a fraction of the wavelength of the mid-frequency of a given operating band, said first conductor being disposed to present a configuration which with respect to said second conductor provides an inductance and capacitance resonant section, and said plane surface is of an area sufficiently great to underlie entirely said configuration to ensure a concentration of substantially the entire electric field between said configuration and said second conductor, and a third conductor having top and side walls overlying in spaced relation at least certain of the configurations of said first conductor, the spacing between said third and first conductors being large compared to the spacing between said first and second conductors, said resonant section including a series resonant circuit comprising a capacitance in series with said first conductor and an inductance in shunt about said capacitance.

7. A filter according to claim 6, wherein the spacing between said first and second conductors and the spacing between said first and third conductors both contain layers of solid dielectric material.

8. A microwave filter according to claim 6, wherein the first conductor is disposed in sinusoidal form in a plane parallel to said second conductor.

9. A microwave filter according to claim 1, wherein the first conductor is disposed at least partially curvilinear in form.

10. A microwave filter according to claim 6, wherein said resonant section also includes a parallel resonant circuit, said parallel resonant circuit comprising a spiral conductor connected to said first conductor and disposed in a plane parallel to said second conductor.

11. A microwave filter according to claim 10, wherein the series resonant circuit includes a break in said first conductor to provide series capacitance and a shunt conductor across said break in a sinusoidal form to provide inductance.

12. In microwave electrical apparatus, first and second conductors, said second conductor having a substantially plane surface, a layer of dielectric material disposed on said plane surface, said first conductor being of a predetermined circuit configuration and disposed on said layer in substantially parallel spaced relation to said second conductor, the spacing between said circuit configuration and the plane surface being small to insure a concentration of the electric field of microwave energy between said circuit configuration and said plane surface, and a third conductor having top and side walls overlying in spaced relation the said circuit configuration of said first conductor, the spacing between the third and first conductors being at least a multiple of the spacing between said first and second conductors, said side walls including means electrically coupling said third conductor to said second conductor, said side walls also including a rim approximately a quarter wavelength wide and means to support said rim in spaced relation to said second conductor to form therewith an electric choke.

References Cited in the file of this patent

UNITED STATES PATENTS

| | | |
|---|---|---|
| 2,159,648 | Alford | May 23, 1939 |
| 2,313,379 | Wood | Mar. 9, 1943 |
| 2,409,449 | Sanders et al. | Oct. 15, 1946 |
| 2,411,555 | Rogers | Nov. 26, 1946 |
| 2,432,057 | Wheeler | Dec. 2, 1947 |
| 2,602,856 | Rumsey | July 8, 1952 |
| 2,611,822 | Bliss | Sept. 23, 1952 |

FOREIGN PATENTS

| | | |
|---|---|---|
| 22,711/35 | Australia | May 21, 1936 |
| 601,514 | Great Britain | May 7, 1948 |
| 632,834 | Great Britain | Dec. 5, 1949 |